UNITED STATES PATENT OFFICE.

RUDOLF TAMBACH, OF LUDWIGSHAFEN-ON-THE-RHINE, GERMANY, ASSIGNOR, BY MESNE ASSIGNMENTS, TO THE CHEMICAL FOUNDATION, INC., A CORPORATION OF DELAWARE.

PROCESS FOR PRODUCING TANNIC-ACID COMPOUND OF THE DIGITALISGLYCOSIDS.

1,391,705. Specification of Letters Patent. Patented Sept. 27, 1921.

No Drawing. Application filed January 18, 1917. Serial No. 143,144.

*To all whom it may concern:*

Be it known that I, Dr. RUDOLF TAMBACH, chemist, a subject of the German Emperor, residing at No. 97 Bleichstrasse, in the city of Ludwigshafen-on-the-Rhine, German Empire, have invented an Improvement in Processes for Producing Tannic-Acid Compounds of the Digitalisglycosids, for which I have filed application in Germany, July 12, 1915, and application in Sweden, July 7, 1915; and I do hereby declare the following to be a full, clear, and exact description of the same.

It has been shown that the effective constituents of digitalis are the digito-glucotannoids. The compounds isolated from the same are nearly insoluble in water and diluted acids, but are easily soluble in alcohol and alkalis.

It has been found that such digito-glucotannoids can be compounded from their constituents, that is, from the glucosids found in digitalis purpurea and tannic acid.

Owing to their difficult solubility in dilute acids, such preparations are without any effect in the stomach, while, owing to their being easily soluble in alkalis, they are easily absorbed by the bowels. Further, owing to their solubility in dilute alkalis they are especially suitable for injection purposes.

It is known that the digitalisglucosids, the glucosids occurring in digitalis purpurea, as digitoxin $C_{21}H_{32}O_7$ are precipitated by tannic acid (by which is meant the ordinary gallo tannic acid or tannic acid obtained by the extraction of nutgalls). The tannate of digitalin is described as a pitch-like mass (compare: Schmidt, *Pharm. Chemie* 5, edition II, 2 (1911) page 1878, line 7 from the bottom), but no remarks are made as to its properties. The same applies in regard to tannate of digitoxin (compare: Hager, *Pharm. Praxis* I. (1900) page 1028, 1029, 1033). On page 1035, line 22 of said work, it is stated that tannate of digitalin is insoluble in water.

The tannates of glucosids produced according to these works differ essentially from the digito-gluco-tannoids produced according to my invention. While the products obtained by Schmidt and Hager are only partially soluble in dilute alkalis, and the solutions, when heated, become cloudy, the digito-gluco-tannoids produced according to my novel process are easily soluble in alkalis, and the solutions remain clear when sterilized.

The digito-gluco-tannoids form uniform chemical compounds. They are certainly not mixtures, because, for example, they may be precipitated from their alcoholic solutions by acids without alteration.

*Example I.*

An alkaline aqueous solution of the digitotannates naturally occurring in the purpurea is extracted with chloroform, to which some alcohol, methylalcohol or similarly acting solvent, is added, and the solvent is then removed by distillation. 100 g. of the glucosid mixture are then dissolved in 500 ccm. of ethyl alcohol and to this solution is added an alcoholic solution of 300 g. of tannate compounds isolated from digitalis purpurea. The solvent is removed and the product dried. The powdered and sieved residue is a gray-brown powder, which is insoluble in water and dilute acids, but is soluble in alcohol, and easily soluble in alkalis.

In this way it is possible to produce preparations for therapeutic purposes which are chemically uniform compounds. These compounds are desirable as therapeutical applications to the stomach, and, furthermore, because of their solubility in dilute alkalis, they are readily absorbed by the bowels. For the same reason they are especially well suited for administration by intravenous injection.

Furthermore, this property which this preparation possesses whereby it readily forms solutions with dilute alkalis renders it possible to produce solutions of high concentration for intravenous injections, a property which no other similar preparation possesses, with the exception of the natural digitotannates. One may obtain, in accordance with the method set forth, preparations containing any desired proportion of the digitalisglucosids. That is the glucosids may be introduced into the preparation in the same proportion as that in which they are found in the digitalis plant, or the constituents entering into the preparation of the digito-gluco-tannoids may be used separately, as for instance, digitoxin— the most active constituent of the glucosid mixture obtained by extraction of the digitalis plant and which glucosid mixture is commonly known as digitalis—or any one of the individual extraction fractions may be used separately, as for instance, the glucosid extraction mixture known as digitalin, or by way of further example, the digitotannate mixture.

What I claim and desire to secure by Letters Patent of the United States is:—

1. The process of producing a therapeutical preparation which comprises extracting a solution of digitotannates with a solvent, removing the solvent by distillation, dissolving the product thus obtained in alcohol, adding thereto an alcoholic solution of tannates, and thereafter removing the solvent.

2. The process of producing a therapeutical preparation which comprises extracting an aqueous solution of digitotannates with a solvent, removing the solvent by distillation, dissolving the product thus obtained in alcohol, adding thereto an alcoholic solution of tannates, removing the solvent, and thereafter drying the resulting product.

3. The process of producing a therapeutical preparation which comprises extracting an alkaline aqueous solution of digitotannates with a solvent containing chloroform, removing the solvent by distillation, dissolving the product thus obtained in alcohol, adding thereto an alcoholic solution of tannates, and finally removing the solvent.

4. The process of producing a therapeutical preparation which comprises extracting an alkaline aqueous solution of digitotannates with a mixture of chloroform and alcohol, removing the solvent by distillation, dissolving the product thus obtained in alcohol, adding thereto an alcoholic solution of tannates, removing the solvent, and finally drying the resulting product.

5. The process of producing a therapeutical preparation which comprises extracting an alkaline aqueous solution of digitotannates with a mixture of chloroform and ethyl alcohol, removing the solvent by distillation, dissolving the digitoxin thus obtained in alcohol, adding thereto an alcoholic solution of tannates derived from digitalis purpurea, and thereafter removing the solvent.

6. The process of producing a therapeutical preparation which comprises extracting an alkaline aqueous solution of digitotannates with a mixture of chloroform and ethyl alcohol, removing the solvent by distillation, dissolving about 100 grams of the glocosids thus obtained in about 500 cubic centimenters of ethyl alcohol, adding thereto an alcoholic solution containing about 300 grams of the tannates derived from digitalis purpurea, and thereafter removing the solvent.

7. As a new therapeutical preparation, the digitogluco-tannic acid compound obtained by treating digitalis glucosids with a tannic acid compound, said preparation being a grayish brown powder, amorphous, insoluble in water and dilute acids, soluble in ethyl alcohol, and readily soluble in alkalis.

In testimony whereof I have signed my name to this specification in the presence of two subscribing witnesses.

DR. RUDOLF TAMBACH.

Witnesses:
OSWALD KRUG,
RUTH T. MANN.